(12) United States Patent
Khapali et al.

(10) Patent No.: US 12,423,598 B2
(45) Date of Patent: Sep. 23, 2025

(54) MANAGING USER MACHINE LEARNING (ML) MODELS

(71) Applicant: International Business Machines Corporation, Armonk, NY (US)

(72) Inventors: Mahadev Khapali, Bangalore (IN); Shashank Vijaykumar Vagarali, Bangalore (IN); Hemant Singh, Bengaluru (IN); Yugandhra Rayanki, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 17/200,994

(22) Filed: Mar. 15, 2021

(65) Prior Publication Data

US 2022/0292373 A1    Sep. 15, 2022

(51) Int. Cl.
*G06N 5/04*    (2023.01)
*G06N 20/00*    (2019.01)

(52) U.S. Cl.
CPC .............. *G06N 5/04* (2013.01); *G06N 20/00* (2019.01)

(58) Field of Classification Search
CPC ............ G06N 5/04; G06N 20/00; G06N 3/08; G06N 3/04
See application file for complete search history.

(56) References Cited

U.S. PATENT DOCUMENTS

| 8,533,235 | B2 | 9/2013 | Agrawal |
| 10,296,848 | B1 | 5/2019 | Mars |
| 2007/0244650 | A1 | 10/2007 | Gauthier |
| 2012/0265720 | A1 | 10/2012 | Agrawal et al. |
| 2019/0272479 | A1 | 9/2019 | Mars |
| 2020/0012962 | A1* | 1/2020 | Dent ..................... G06N 20/00 |
| 2021/0034960 | A1* | 2/2021 | Khapali .................. G06N 3/08 |
| 2021/0178269 | A1* | 6/2021 | Fear ...................... A63F 13/798 |
| 2022/0004704 | A1* | 1/2022 | Michaelson ............ G06N 5/04 |
| 2022/0343167 | A1* | 10/2022 | Chawla ................... G06N 5/01 |

OTHER PUBLICATIONS

"System for Parallel Machine Learning Models Deployment and Continuous Learning", An IP.com Prior Art Database Technical Disclosure, Authors et. al.: Disclosed Anonymously, IP.com No. IPCOM000255014D, IP.com Electronic Publication Date: Aug. 24, 2018, 3 pages.

* cited by examiner

*Primary Examiner* — Kamran Afshar
*Assistant Examiner* — Brian J Hales
(74) *Attorney, Agent, or Firm* — Gavin Giraud

(57) ABSTRACT

A method for receiving an end-user model access data set, deriving a plurality of patterns of actions typically performed by the end-user based on analysis of the end-user model access data set, and deriving a first model deployment protocol to automatically deploy selected ML models of the plurality of ML models for the end-user when the end-user works with ML models based on the plurality of patterns of actions.

18 Claims, 6 Drawing Sheets

400

SCREEN SHOT DISPLAY GENERATED BY A COMPUTER

END-USER STATS (PAST FOUR HOURS):
     1 LOGIN OPERATION
     2 TRAIN-MODEL OPERATIONS
     3 SAVE-MODEL OPERATIONS
     4 DEPLOY-MODEL OPERATIONS
     5 DELETE-MODEL OPERATIONS
  58 MINUTES: TIME USER HAS BEEN INACTIVE

PATTERN DETECTED: AFTER A BUSY MORNING, THE END-USER IS LIKELY ON HER CUSTOMARY ONE HOUR LUNCH BREAK

AUTOMATIC DEPLOYMENT ACTIONS SCHEDULED: WHEN / IF USER INACTIVE TIME REACHES 59 MINUTES AND 59 SECONDS, THEN AUTOMATICALLY DEPLOY THE THREE ML MODELS THAT WERE SUBJECT TO SAVE OPERATIONS IN THE PAST FOUR (4) HOURS UNDER THE "BACK-FROM-LUNCH" PROTOCOL

FIG. 4

MANAGING USER MACHINE LEARNING (ML) MODELS

BACKGROUND

The present invention relates generally to the field of machine learning (ML) models and ML environments. As the term is used herein, the term ML environment means any set of computer hardware, software and/or firmware that can perform "machine learning."

The Wikipedia entry for "Machine Learning" (as of Feb. 18, 2021) states as follows: "Machine learning (ML) is the study of computer algorithms that improve automatically through experience. It is seen as a part of artificial intelligence. Machine learning algorithms build a model based on sample data, known as 'training data', in order to make predictions or decisions without being explicitly programmed to do so. Machine learning algorithms are used in a wide variety of applications, such as email filtering and computer vision, where it is difficult or unfeasible to develop conventional algorithms to perform the needed tasks. Machine learning involves computers discovering how they can perform tasks without being explicitly programmed to do so. It involves computers learning from data provided so that they carry out certain tasks. For simple tasks assigned to computers, it is possible to program algorithms telling the machine how to execute all steps required to solve the problem at hand; on the computer's part, no learning is needed. For more advanced tasks, it can be challenging for a human to manually create the needed algorithms. In practice, it can turn out to be more effective to help the machine develop its own algorithm, rather than having human programmers specify every needed step." (footnote(s) omitted)

A "machine learning model" is any piece of computer code that, through the use of machine learning and its training, makes recommendations, predictions, or decisions without being explicitly programmed to do. For purposes of this document, a "user machine learning model" is any machine learning model that has been trained, at least in part, specifically for a given user (or set of users).

SUMMARY

The present invention relates According to an aspect of the present invention, there is a method, computer program product and/or system that performs the following operations (not necessarily in the following order): (i) receiving an end-user model access data set including information related to the following actions of the end-user when working with the plurality of ML models: login, train-model, save-model, deploy-model, and delete-model; (ii) deriving a plurality of patterns of actions typically performed by the end-user based on analysis of the end-user model access data set; and (iii) deriving a first model deployment protocol to automatically deploy selected ML models of the plurality of ML models for the end-user when the end-user works with ML models based on the plurality of patterns of actions.

BRIEF DESCRIPTION OF THE DRAWINGS

FIG. 4 is a screenshot view generated by the first embodiment system;

DETAILED DESCRIPTION

Figure 1:
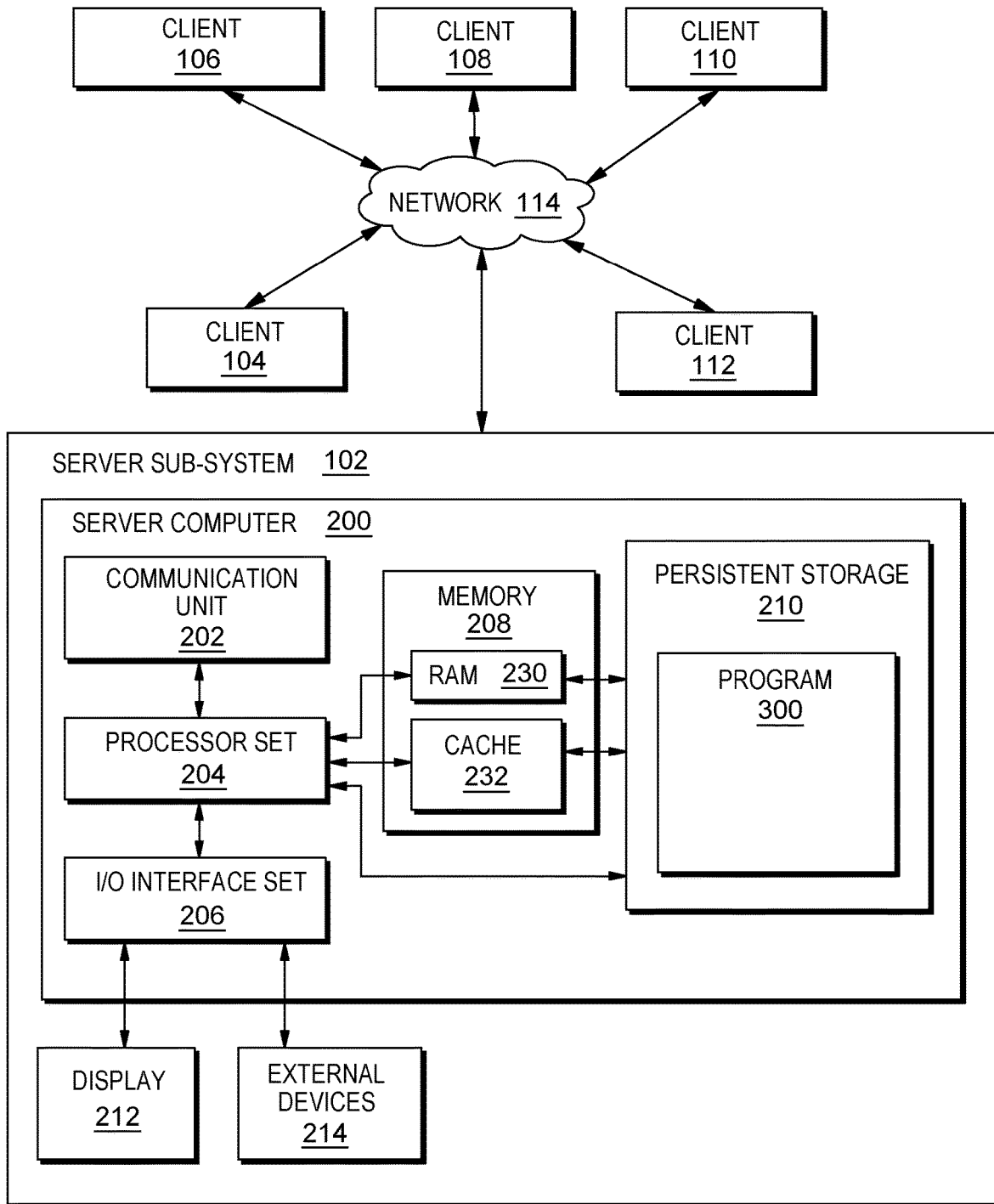
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications, and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
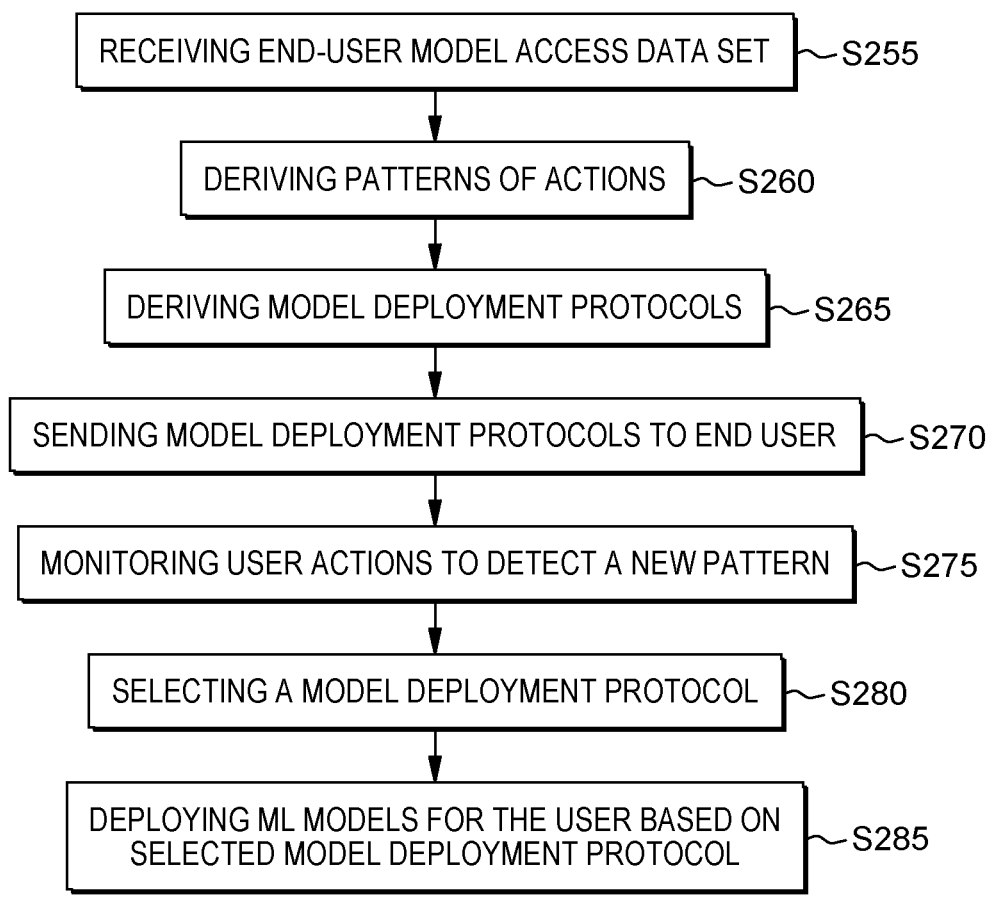
FIG. 2 is a flowchart showing a first embodiment method performed, at least in part, by the first embodiment system.
Figure 3:
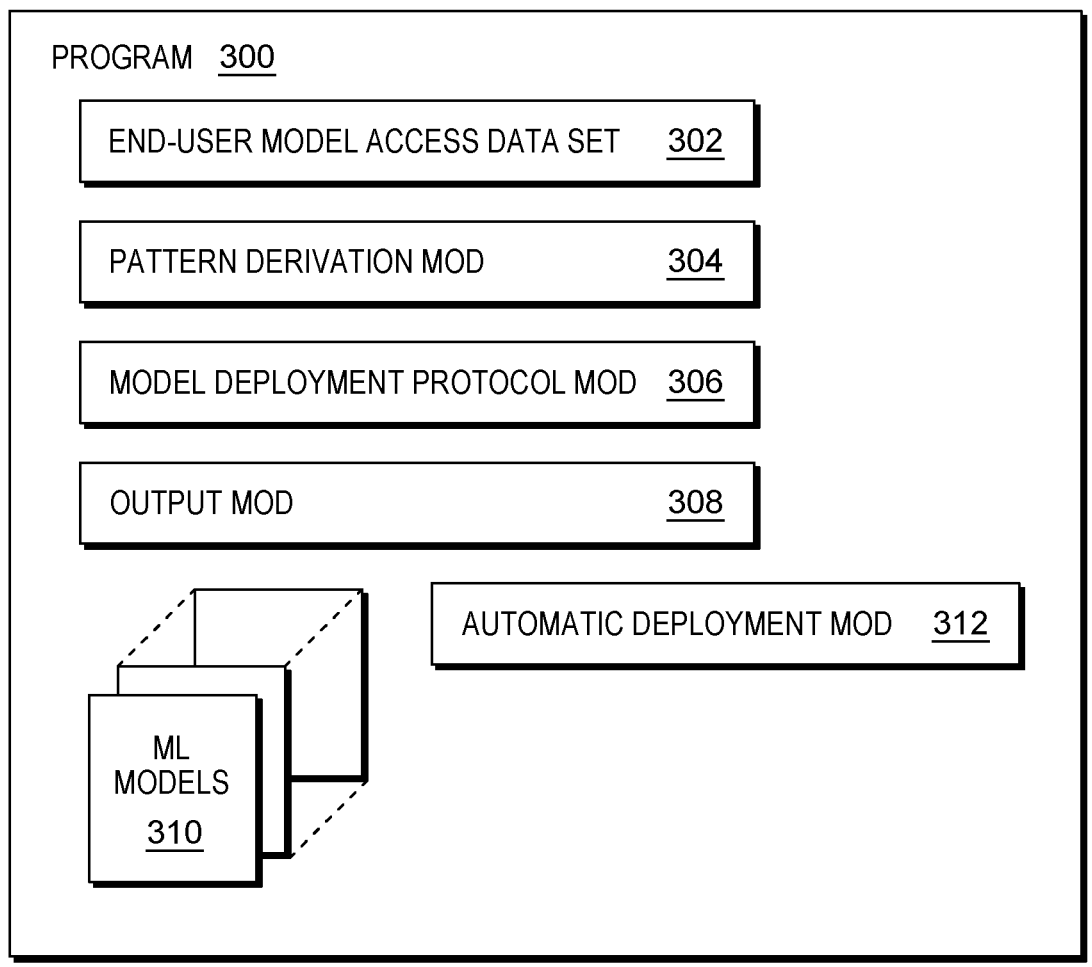
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Taken as a whole, flowchart 250 represents computer-implemented method (CIM) for use with multiple machine language (ML) models 310 that are accessed by an end-user (represented through client subsystem 104) who works with the ML models.

Processing begins at operation S255 where end-user model access data set 302 is received. The end-user model access data set includes information related to certain actions of the end user (in this example, the user of client subsystem 104) when working with ML models 310. Specifically, in this example, the actions of the end user that are monitored and reflected in data set 302 are the following actions: login, train-model, save-model, deploy-model, and delete-model. This operation is shown in the top portion of screenshot 400 of FIG. 4.

Processing proceeds to operation S260, where pattern derivation module ("mod") 304 derives a set of patterns. Each pattern is a pattern relating to actions typically performed by the end-user based on analysis of the end-user model access data set. This operation is shown in the middle portion of screenshot 400 of FIG. 4.

Processing proceeds to operation S265 where model deployment protocol mod 306 derives a first model deployment protocol to automatically deploy selected ML models. The selected ML models are selected from among the multiple ML models for the end-user when the end-user works with ML models. The derivation of the first model deployment protocol based on the plurality of patterns of actions. In this example, the protocol includes: (i) identities of the ML models to be deployed under the protocol; and (ii) triggering conditions (for example, passage of a specified period of time) that cause each deployment to occur.

Processing proceeds to S270, where output mod 308 communicates, over communication network 114 and to client subsystem 104, the first model deployment protocol.

Processing proceeds to operation S275 where automatic deployment protocol mod 312 monitors ML model access related actions of the end-user of client subsystem 104 with respect to models 310.

Processing proceeds to operation S280 where mod 312, responsive to the monitoring, determines that a pattern in the ML model access related actions of the end-user dictate that the first deployment protocol should be invoked.

Processing proceeds to operation S285 where mod 312, responsive to the determination that use of the first deployment protocol is dictated, invokes the first model deployment protocol to automatically deploy selected ML models from among models 310. This operation is shown in the bottom portion of screenshot 400 of FIG. 4.

In some embodiments, the derivation of the plurality of patterns of actions typically performed by the end-user includes performing a cognitive self-learning method, as may be further discussed in the following subsection of this Detailed Description section.

In some embodiments, the derivation of the first model deployment protocol includes performing a cognitive self-learning method to intelligently deploy and manage user ML models in a machine learning environment, as may be further discussed in the following subsection of this Detailed Description section.

In some embodiments: (i) the cognitive self-learning method will continuously learn the end-user behavior and actions; and (ii) the first ML model deployment protocol deploys the ML model intelligently by cognitively profiling user action patterns. This may be further discussed in the following subsection of this Detailed Description section.

III. Further Comments and/or Embodiments

Some embodiments of the present invention recognize the following facts, potential problems and/or potential areas for improvement with respect to the current state of the art: (i) the typical flow of machine learning model deployment and scoring includes: (a) training data ingestion, (b) training data preparation, (c) training the model, (d) saving the model, (e) deploying the model, (f) scoring the model, and/or (g) managing the model deployed; (ii) using user training with "N" number of models and performing a save operation, the model are deployed in a machine learning (ML) environment as an online service or used for batch prediction; (iii) in a machine learning environment, resource like CPU (central processing unit), memory, network, and time-taken to load the ML model play a crucial role; and/or (iv) in the current world of machine learning, users expect his/her models to be deployed and scored quickly for their day to day business decision making applications.

Some embodiments of the present invention may include one, or more, of the following operations, features, characteristics and/or advantages: (i) includes cognitively profiling the users actions, such as model train/deploy/save/delete; (ii) derives a pattern to deploy models efficiently; (iii) intelligently builds self-learning data metrics which predicts the top ranked models/deployments and assures the deployment is readily available for users to use (that is, saves the model deployment and inference time in ML (machine learning) system); (iv) provides intelligent model deployment by prefetching the model, resulting in efficient usage of resources in cloud/hybrid environments; and/or (v) includes cognitively profiling the users actions with efficient usage of resources.

Some embodiments of the present invention may include one, or more, of the following operations, features, characteristics and/or advantages: (i) includes a cognitive self-learning method to intelligently deploy and manage user ML models in a machine learning environment; (ii) the cognitive self-learning method will continuously learn the end-user behavior and actions such as login, train-model, save-model, deploy-model, and delete-model; (iii) depending on the users profiled data, the system will derive the users pattern and eventually derive an intelligent way to deploy the required models quickly, and efficiently manage the system resources; and/or (iv) deploys the ML model intelligently by cognitively profiling the user action patterns.

Some embodiments of the present invention include logic implementation of "cognitive intelligent deploy and manage models (CIDMM)" and are described in the following three (3) paragraphs.

The CIDMM maintains an internal self-learning metrics table with different "High Rank Models" as the Y axis and different users as the X axis. This is shown in Table 1 below.

TABLE 1

Internal Self-Learning Metrics Table

| User 1 | User 2 | User 3 | User "N" |
|---|---|---|---|
| ModelU1P1 | ModelU2P1 | ModelU3P1 | ModelUNP1 |
| ModelU1P2 | ModelU2P2 | ModelU3P2 | ModelUNP2 |
| ModelU1P3 | ModelU2P3 | ModelU3P3 | ModelUNP3 |
| ModelU1P4 | ModelU2P4 | ModelU3P4 | ModelUNP4 |

When the machine learning service is ready, the top ranked models (like ModelU1P1, ModelU2P1 etc.) as shown in Table 1, are deployed by default, as the probability of prediction requests for these are high. CIDMM also maintains one more internal self-learning metrics table with Individual User Model Flows as X axis & and it's usage as "High Rank Models" as Y axis. User 1 data is shown in Table 2 below.

TABLE 2

User 1 Data

| Usage Flow 1 | Usage Flow 2 | Usage Flow "N" |
|---|---|---|
| UF1M1 | UF1M1 | UFNM6 |
| UF1M5 | UF2M3 | UFNM1 |
| UF1M2 | UF2M2 | UFNM3 |
| UF1M3 | UF2M4 | UFNM2 |

Every model belonging to a user will maintain metadata, which includes information such as weights for every other model. If UF1M1 is deployed and immediately after UF1M5 is used for the next prediction, then add (+1) weights to the UF1M5 model in the UF1M1 metadata. This continues for every prediction for the user. At regular intervals, the CIDMM algorithm will derive the above flow table (Table 2) using the model metadata with the corresponding model weights. Using the above derived table, the CIDMM algorithm will intelligently predict the next model which will be used for model prediction. Corresponding models will be deployed in advance and hence, drastically reduce the time required for deployment and prediction.

Figure 5:
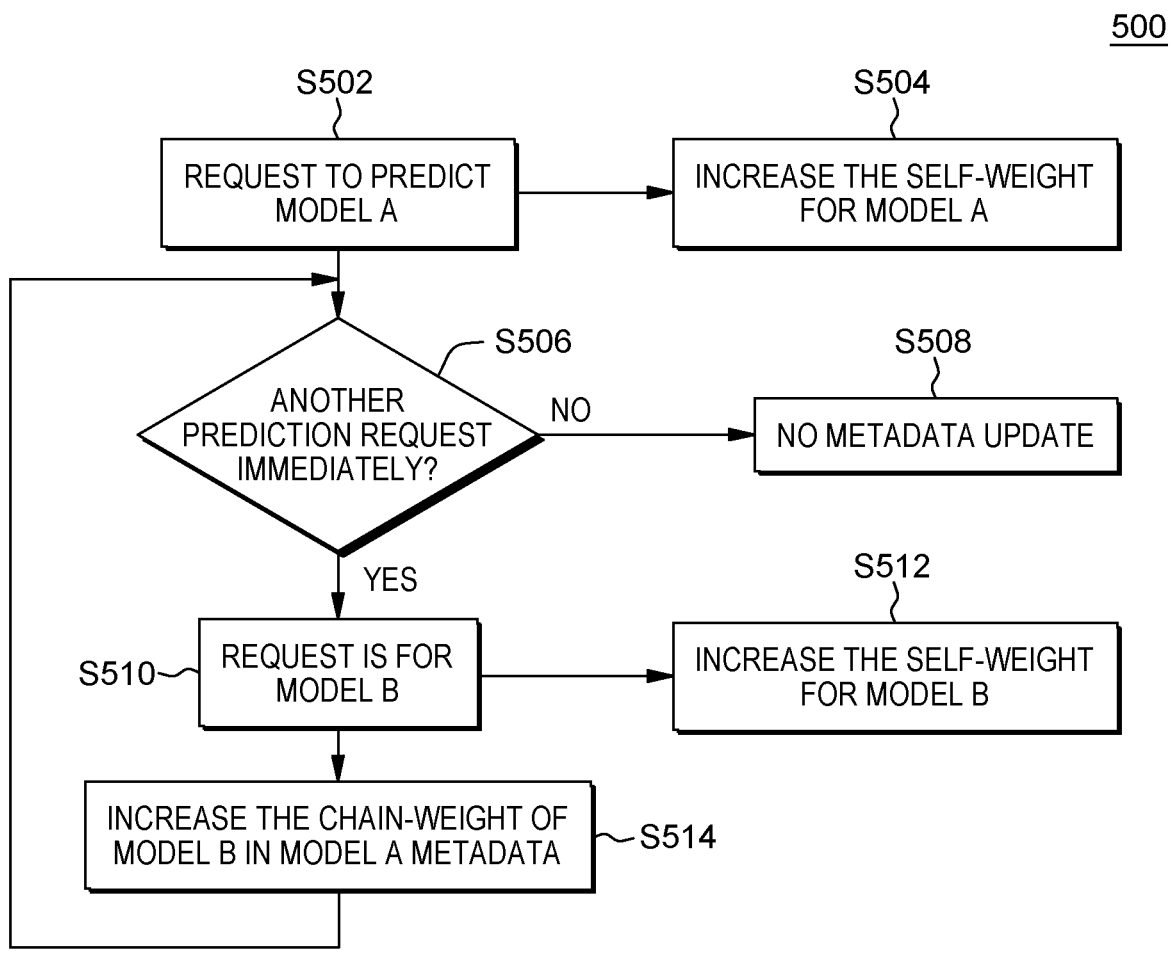
FIG. 5 is a flowchart showing a second embodiment of method according to the present invention.

As shown in FIG. 5, CIDMM algorithm user flowchart 500 includes: request to predict model A block S502; increase the self-weight for model A block S504; another prediction request immediately decision block S506; no metadata update block S508; request is for model B block S510; increase the self-weight for model B block S512; and increase the chain-weight of model B in model A metadata block S514.

Some embodiments of the present invention will now be described by referring to FIG. 5, flowchart 500 for a single user.

In operation S502, a request to predict model A is received.

In operation S504, an increase to the self-weight for model A is performed.

In operation S506, determining if another model prediction request should be made immediately is performed. If NO, no metadata update is performed by operation S508. If YES, identifying/requesting a new model is performed by operation S510. In this case, model B is the new model that is identified.

In operation S512, increasing the self-weight for model B is performed.

In operation S514, increasing the chain-weight for model B in model A metadata is performed. In addition, operation S514 will return processing back to operation S506 to repeat the cycle until model "N" is reached.

Figure 6:
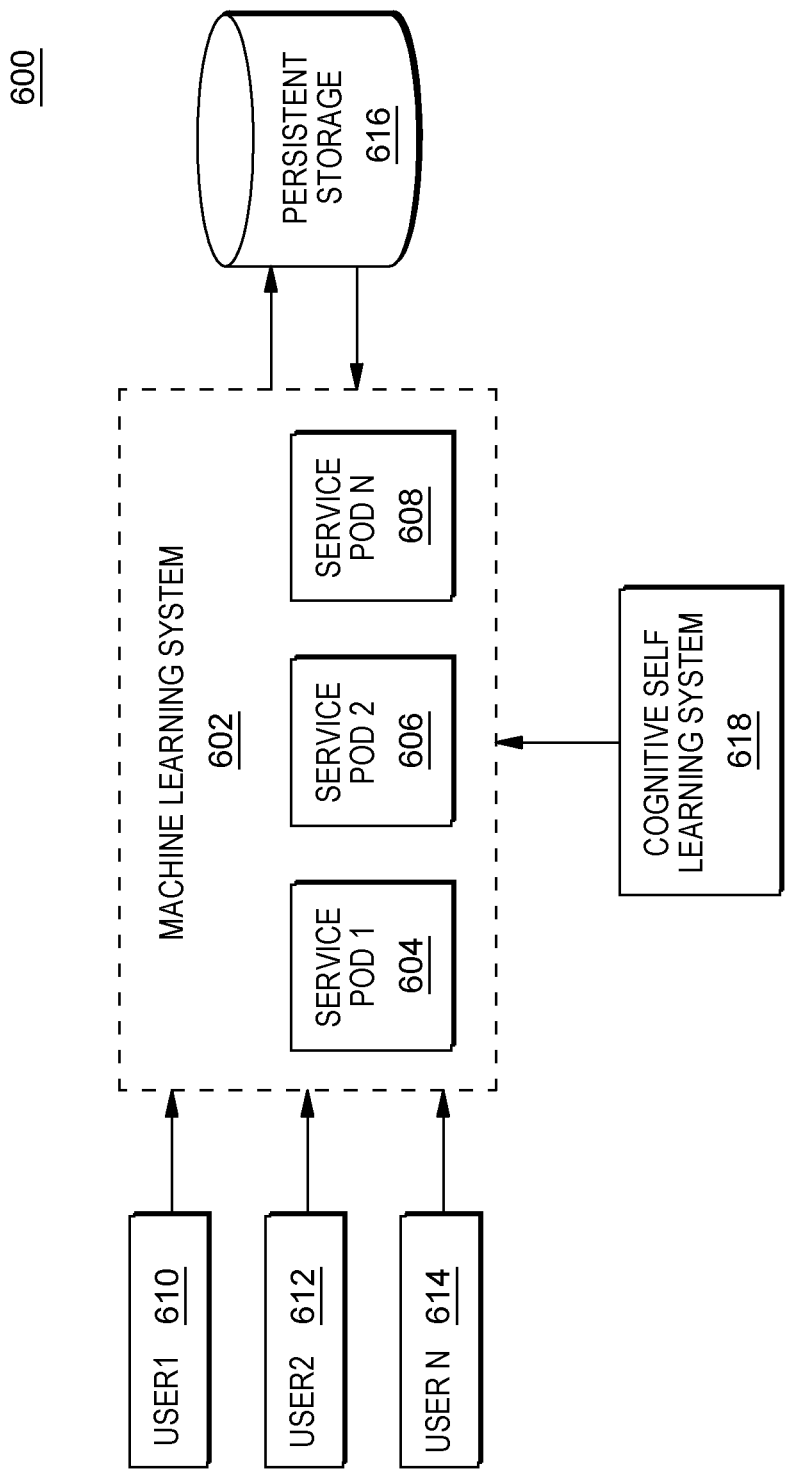
FIG. 6 is a block diagram of a second embodiment of a system according to the present invention.

As shown in FIG. 6, computer system 600 includes: machine learning system block 602; service pod 1 block 604; service pod 2 block 606; service pod N block 608; user1 block 610; user2 block 612; user N block 614; persistent storage block 616; and cognitive self-learning system block 618.

Some embodiments of the present invention may include one, or more, of the following operations, features, characteristics and/or advantages: (i) using the CIDMM algorithm, the list of high ranked models can be cognitively derived by using self-weights; (ii) using chain-weights, the pattern for the user model flow can also be derived; (iii) includes periodically updating the self-learning list; (iv) using both the internal self-learning metrics table (Table 1) and the user data table (Table 2), the CIDMM algorithm will intelligently predicts the next model which will be used for model prediction; and/or (v) corresponding models will be deployed in advance and hence will drastically reduce the time required for deployment and prediction.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above— similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use with a plurality of machine language (ML) models that are accessed by an end-user who works with ML models, the CIM comprising:
   receiving an end-user model access data set including information related to actions of the end-user when working with the plurality of ML models;
   deriving a plurality of patterns of model-related actions performed by the end-user based on analysis of the end-user model access data set;
   maintaining an internal self-learning metrics table comprising model metadata comprising model usage flow weights for each of the plurality of ML models used by the end-user that update based on the end-user model access data; and
   automatically deploying selected ML models of the plurality of ML models for the end-user when the end-user works with ML models based on the plurality of patterns of actions and the model weights stored in the internal self-learning metrics table, wherein automatic deployment reduces model selection latency and improves workflow efficiency by preemptively loading models.

2. The CIM of claim 1 further comprising:
   communicating, over a communication network and to a computer of the end-user, the first model deployment protocol.

3. The CIM of claim 1 further comprising:
   monitoring ML model access related actions of the end-user;
   responsive to the monitoring, determining that a pattern in the ML model access related actions of the end-user dictate that the first deployment protocol should be invoked; and
   responsive to the determination that use of the first deployment protocol is dictated, invoking the first model deployment protocol to automatically deploy selected ML models.

4. The CIM of claim 1 wherein the derivation of the plurality of patterns of model-related actions performed by the end-user includes performing a cognitive self-learning method.

5. The CIM of claim 1 wherein the derivation of the first model deployment protocol includes performing a cognitive self-learning method to deploy and manage user ML models in a machine learning environment.

6. The CIM of claim 5 wherein:
   the cognitive self-learning method continuously learns the end-user behavior and actions; and the first ML model deployment protocol deploys the ML model by cognitively profiling user action patterns.

7. A computer program product (CPP) comprising:
a computer readable storage medium; and
computer code stored collectively in the computer readable storage medium, with the computer code including data and instructions to cause a processor(s) set to perform at least the following operations:
receiving an end-user model access data set including information related to actions of the end-user when working with the plurality of ML models;
deriving a plurality of patterns of actions performed by the end-user based on analysis of the end-user model access data set;
maintaining an internal self-learning metrics table comprising model metadata comprising model usage flow weights for each of the plurality of ML models used by the end-user that update based on the end-user model access data; and
automatically deploying selected ML models of the plurality of ML models for the end-user when the end-user works with ML models based on the plurality of patterns of actions and the model weights stored in the internal self-learning metrics table, wherein automatic deployment reduces model selection latency and improves workflow efficiency by preemptively loading models.

8. The CPP of claim 7 wherein the computer code further includes instructions for causing the processor(s) set to perform the following operation(s):
communicating, over a communication network and to a computer of the end-user, the first model deployment protocol.

9. The CPP of claim 7 wherein the computer code further includes instructions for causing the processor(s) set to perform the following operation(s):
monitoring ML model access related actions of the end-user;
responsive to the monitoring, determining that a pattern in the ML model access related actions of the end-user dictate that the first deployment protocol should be invoked; and
responsive to the determination that use of the first deployment protocol is dictated, invoking the first model deployment protocol to automatically deploy selected ML models.

10. The CPP of claim 7 wherein the derivation of the plurality of patterns of model-related actions performed by the end-user includes performing a cognitive self-learning method.

11. The CPP of claim 7 wherein the derivation of the first model deployment protocol includes performing a cognitive self-learning method to deploy and manage user ML models in a machine learning environment.

12. The CPP of claim 11 wherein:
the cognitive self-learning method continuously learns the end-user behavior and actions; and
the first ML model deployment protocol deploys the ML model by cognitively profiling user action patterns.

13. A computer system (CS) comprising:
a processor(s) set;
a set of storage device(s); and
computer code stored collectively in the set of storage device(s), with the computer code including data and instructions to cause the processor(s) set to perform at least the following operations:
receiving an end-user model access data set including information related to actions of the end-user when working with the plurality of ML models;
deriving a plurality of patterns of actions performed by the end-user based on analysis of the end-user model access data set;
maintaining an internal self-learning metrics table comprising model metadata comprising model usage flow weights for each of the plurality of ML models used by the end-user that update based on the end-user model access data; and
automatically deploying selected ML models of the plurality of ML models for the end-user when the end-user works with ML models based on the plurality of patterns of actions and the model weights stored in the internal self-learning metrics table, wherein automatic deployment reduces model selection latency and improves workflow efficiency by preemptively loading models.

14. The CS of claim 13 wherein the computer code further includes instructions for causing the processor(s) set to perform the following operation(s):
communicating, over a communication network and to a computer of the end-user, the first model deployment protocol.

15. The CS of claim 13 wherein the computer code further includes instructions for causing the processor(s) set to perform the following operation(s):
monitoring ML model access related actions of the end-user;
responsive to the monitoring, determining that a pattern in the ML model access related actions of the end-user dictate that the first deployment protocol should be invoked; and
responsive to the determination that use of the first deployment protocol is dictated, invoking the first model deployment protocol to automatically deploy selected ML models.

16. The CS of claim 13 wherein the derivation of the plurality of patterns of model-related actions performed by the end-user includes performing a cognitive self-learning method.

17. The CS of claim 13 wherein the derivation of the first model deployment protocol includes performing a cognitive self-learning method to deploy and manage user ML models in a machine learning environment.

18. The CS of claim 17 wherein:
the cognitive self-learning method continuously learns the end-user behavior and actions; and
the first ML model deployment protocol deploys the ML model by cognitively profiling user action patterns.

* * * * *